3,482,049
Patented Dec. 2, 1969

3,482,049

RADA RECEIVER SYSTEM

Shinzo Kobayashi, Kumaichi Onishi, Akira Kawakami, and Nobuhiro Nakamura, Amagasaki, Japan, assignors to Mitsubishi Denki Kabushiki Kaisha, Tokyo, Japan Filed Aug. 31, 1966, Ser. No. 576,462
Claims priority, application Japan, Sept. 27, 1965, 40/59,062
Int. Cl. H04j 3/00
U.S. Cl. 179—15 2 Claims

ABSTRACT OF THE DISCLOSURE

A RADA receiver comprises a pulse width detector circuit between an AND circuit and a demodulator of an address decoder. The pulse width detector circuit removes pulses having durations shorter than the normal pulse width, thereby reducing spurious address.

This invention relates in general to a random access discrete address communication system and more particularly to a receiver apparatus for use in such a communication system.

There has been already known a communication system in which a relatively wide frequency band is assigned to a multiplicity of telephone subscribers in the form of a common use, and by combining a frequency division multiplexing system with a time division multiplexing system, individual signals transmitted between pairs of telephone subscribers are separated from each other by the adoption of a time and frequency division system while at the same time the individual subscribers are identified by the use of time and frequency divided address codes. This communication system is often abbreviated to "RADA" communication system. In the RADA communication system a multiplicity of telephone subscribers can randomly send pulses so that a combination of several pulses from some subscribers may form an address of a certain telephone subscriber who does not desired to be telephoned by them. That address is called a "spurious address" hereinafter.

Accordingly it is an object of the invention to provide a new and improved RADA receiver system by which the occurrence of the "spurious addresses" just described is reduced, and the quality of communication is improved.

It is another object of the invention to provide a new and improved RADA receiver system which enables an increase in the number of communication channels.

It is still another object of the invention to provide a new and improved RADA receiver system including an extremely simple circuitry by which the occurrence of the spurious addresses is reduced, the quality of communication is improved and the number of communication channels is increased.

With the aforesaid objects in view, the invention resides in a RADA receiver system including a pulse-width detector circuit between an AND circuit of an address decoder and a modulator to remove any input pulse having a pulse-width less than a predetermined magnitude.

These and other objects and advantages of the invention will be better understood from the following detailed description in conjunction with the accompanying drawings in which.

The RADA communication system generally comprises modulating audio signals by the pulse position modulation (PPM) or delta modulation or pulse code modulation (PCM) technique or the like, passing the modulated signals to time delay circuits to impart to the signals different time delays, applying the additionally time delayed signals to oscillators to transmit the signals in the form of subdivided frequencies $F_1$, $F_2$, $F_3$, etc., and receiving the transmitted signals by an appropriate receiver circuitry to reproduce the original audio signals. One example of such receiver circuitry is illustrated in FIG. 2 of the drawings as will be subsequently described.

Figure 2:
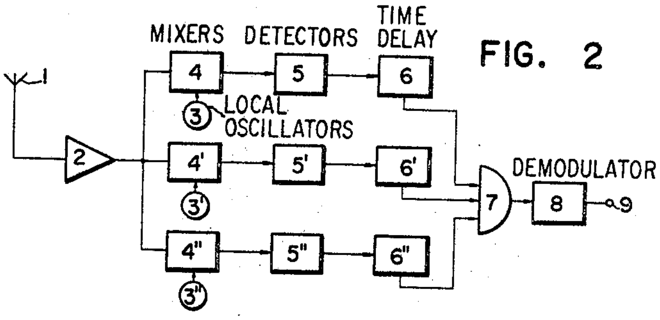
FIG. 2 is a block diagram of the conventional type of receiver circuitry used in the RADA receiver system.

In FIG. 2, an antenna 1 picks up the signals having the various frequencies, in this case, the frequencies of $F_1$, $F_2$ and $F_3$ and being transmitted just in the same manner as described above and applies the received signals to a common high frequency amplifier 2. After having been amplified, the signals are applied to three mixers 4, 4' and 4'' connected in parallel circuit relationship to the amplifier 2. These mixers 4,4' and 4'' are supplied with different oscillatory frequencies of $FL_1$, $FL_2$ and $FL_3$ from the associated local oscillators 3, 3' and 3'' respectively and convert the signals into the corresponding intermediate frequency signals. The intermediate frequency signals are detected by detectors 5, 5' and 5'' to restore the original pulses. Then the restored pulses pass through time delay networks 6, 6' and 6'' just in the order reverse from on the transmitter side whereby the time delays imparted to the signals on the transmitted side are compensated for. In order to discriminate whether or not those three signals would have been simultaneously received by the antenna 1, that is, whether or not any one or more of the signals would have resulted from a different telephone subscriber or subscribers, the outputs from the time delay networks 6, 6' and 6'' are applied to a discrimination circuit such as an AND circuit 7. The output from the AND circuit 7 is applied to a demodulator 8 where the audio signal is reproduced and supplied to an output terminal 9 connected to a loud speaker or the like.

As above described, the pulsed waves having the frequencies of $F_1$, $F_2$ and $F_3$ may reach the antenna 1 at different times but the outputs from the time delay networks 6, 6' and 6'' are arranged to be simultaneously applied to the inputs to the AND circuit 7. In other words, the output pulses having the frequencies of $F_1$, $F_2$ and $F_3$ coincide with each other at the inputs to the AND circuit 7 whereby the output from the AND circuit 7 for the address of the particular called subscriber has a pulse-width equal to $\tau$ where $\tau$ is a pulse-width of signals used in the RADA communication system and modulated by the PPM technique, for example.

However if the pulses from a plurality of telephone subscribers overlap one another to form a train of pulses corresponding to a spurious address, these pulses do not coincide with one another at the inputs to the AND circuit 7. Under these circumstances, the output from the AND circuit 7 will be composed of individual pulses having different pulse widths. For example, a train of pulses illustrated at *a* in each of FIGS. 5 and 7 includes the first and fourth pulses whose widths $\tau_1$ and $\tau_4$ are shorter than the normal pulse-width $\tau$ used in the RADA communication system and the second and third pulses whose widths $\tau_2$ and $\tau_3$ are longer than the pulse width $\tau$.

Figure 1:
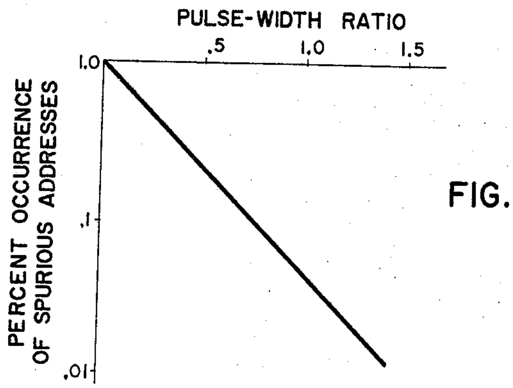
FIG. 1 is a graph illustrating the relationship between a ratio of width of input pulse applied to the RADA receiving system to width of output pulse from an address decoder and percent occurrence of the spurious address.

Referring now to FIG. 1, there is illustrated the relationship between the percent occurrence of "spurious addresses" and a ratio of width $\tau_n$ of output pulse from the abovementioned AND circuit to the normal pulse width $\tau$ used in the RADA communication system. In FIG. 1, the ordinates represent the percent occurrence of spurious address in an arbitrary common logarithmic scale and the abscissas represent the ratio $\tau_n/\tau$ just described in an arbitrary linear scale. It will be seen that the greater the ratio $\tau_n/\tau$ the less the percent occurrence of spurious address will be rapidly. Also it will be appreciated that the correct pulse-width corresponds to the ratio $\tau_n/\tau$ equal to unity and that the spurious addresses occur in a range of pulse-width ratios exceeding one. Therefore, it has been concluded that if only the pulses having pulse-width ratios $\tau_n/\tau$ equal to or greater than unity are sampled while the pulses having pulse-width ratios $\tau_n/\tau$ less than unity are rejected that one and all the accurate addresses can be sampled with the result that the occurrence of spurious addresses reduces leading to improvements in the signal to noise ratio.

The invention is based upon the conclusion just described and characterized by a pulse-width detection circuit disposed between an output of an address decoder and an input to a demodulator in a RADA receiver system to prevent different ones of output pulses having pulse-width ratios $\tau_n/\tau$ less than unity from the address decoder from passing to the input to the modulator.

Figure 3:
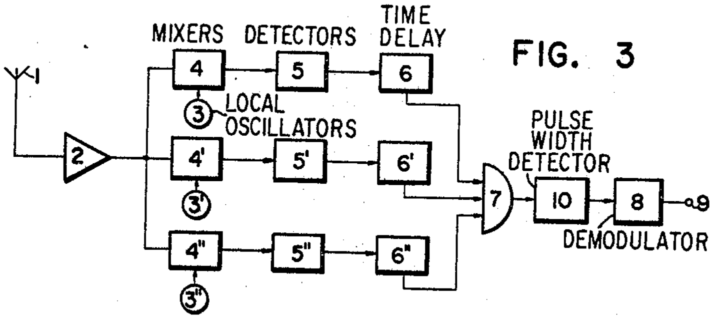
FIG. 3 is a block diagram of a receiver circuitry constructed in accordance with the teachings of the invention.

Referring to FIG. 3, there is illustrated a RADA receiver system constructed in accordance with the teachings of the invention. An arrangement illustrated is substantially similar in configuration and operation to that illustrated in FIG. 2 except for a pulse-width detector circuit disposed between an AND circuit and a demodulator. The same reference numerals have been employed to identify the components corresponding to those illustrated in FIG. 2 and only a difference between the systems will subsequently be described.

In FIG. 3, a pulse-width detector circuit designated by the reference numeral 10 is connected between and AND circuit 7 forming an address decoder with a time delay networks 6, 6′ and 6″ and a demodulator 8 and serves to remove different ones of pulses having pulse-width ratio $\tau_n/\tau$ less than unity, from the AND circuit 7 and to permit individual pulses having pulse-width ratio $\tau_n/\tau$ equal to or greater than unity to pass to the input to the demodulator 8 in the manner as will be described later.

Figure 4:
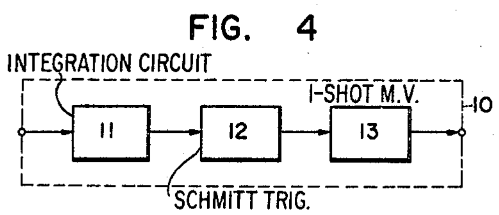
FIG. 4 is a block diagram of one form of a pulse width-detector circuit suitable for use of the invention.

FIG. 4 illustrates one form of the pulse-width detector circuit 10 shown in FIG. 3. As shown in FIG. 4, the pulse-width detector circuit generally designated by dotted block 10 comprises an integration circuit 11, a trigger circuit such as the well known Schmitt trigger circuit 12 having the capability to provide an output of constant amplitude only as long as the input voltage applied thereto is above a predetermined threshold level and to provide no output when the input voltage is below the threshold level, and one shot multivibrator circuit 13 connected serially in the named order.

Figure 5:
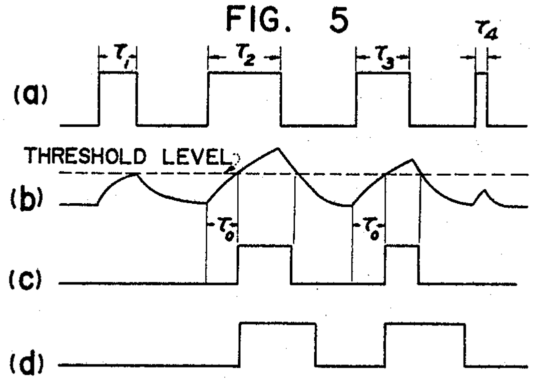
FIG. 5 is a graph useful for explaining the operation of the width-detector circuit illustrated in FIG. 4.

In operation, an output signal from the AND circuit 7, for example, in the form of a waveform shown at *a* in FIG. 5 is applied to the integration circuit 11 where the signal is integrated into an output waveform illustrated at *b* in FIG. 5. Then the integrated waveform is applied to the Schmitt trigger circuit 12. Because of its limiting action the Schmitt trigger circuit 12 provides an output of constant amplitude only as long as the integrated waveform applied thereto is equal to or higher than the threshold level designated by dotted line in FIG. 5*b*. According to the teachings of the invention that threshold level is selected so as to have such a value that the output of constant amplitude exists only when the integrated waveform is applied to the trigger circuit resulting from a pulse or pulses provided by the AND circuit 7 and having a pulse-width $\tau_n$ equal to or greater than a predetermined pulse-width $\tau_0$ which, in turn, is equal to the normal pulse-width in the RADA communication system.

Therefore, in this example, the Schmitt trigger circuit 12 converts the waveform as illustrated at *b* in FIG. 5 into a waveform as illustrated *c* in which the second and third integrated pulses are converted into square pulses while the first and fourth integrated pulses provide no output. In other words, there have been sampled the individual ones of the output pulses from the AND circuit having the pulse-width $\tau_n$ equal to or greater than the predetermined pulse-width $\tau_0$ or those pulses corresponding to the pulse-width ratio $\tau_n/\tau_0$ equal to or greater than unity. The square pulses from the Schmitt circuit 12 are used to drive the one shot multivibrator circuit 13 to provide an output waveform such as shown at *d* in FIG. 5. The output from the multivibrator circuit 13 is applied to the demodulator 8 for the purpose of demodulation.

If the demodulator 8 is of the type just responding to only the front edge of the pulse to demodulate that pulse, the one shot multivibrator 13 may be omitted.

Figure 6:
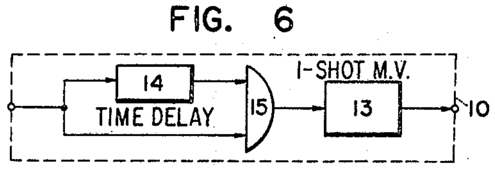
FIG. 6 is a block diagram of a modification of the pulse width-detector circuit suitable for use of the invention.

FIG. 6 illustrates one of modifications of the invention. A pulse-width detector circuit also designated by dotted block 10 in FIG. 6 comprises a time delay network 14, an AND circuit 15 having one input supplied by the time delay network 14 and the other input connected to the output of an address decoder or an AND circuit 7 such as the AND circuit 7 shown in FIG. 3 and a one shot multivibrator circuit 13 connected to the AND circuit 15.

Figure 7:
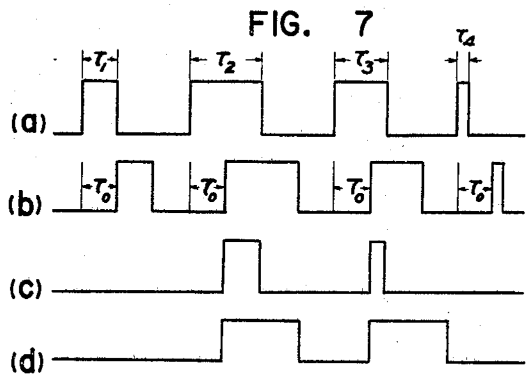
FIG. 7 is a graph useful for explaining the operation of the width-detector circuit illustrated in FIG. 6.

In operation, an AND circuit such as the circuit 7 illustrated in FIG. 3 applies a train of pulses such as shown at *a* in FIG. 7 to both the time delay network 14 and the AND circuit 15. The time delay network 14 functions to delay the pulses applied thereto by a predetermined time interval $\tau_0$ corresponding to the normal pulse-width $\tau$ used in the RADA communciation system. Therefore, the AND circuit 14 is applied with the pulses time delayed as shown by a waveform *b* in FIG. 7 and also with the not-delayed pulses as shown by waveforms *a* in FIG. 7 to provide waveforms as shown at *c* in FIG. 7. Therefore, it will be readily appreciated that, as in the device of FIG. 4, the device shown in FIG. 6 can sample one and all of the output pulses from the preceding AND circuit having a pulse-width $\tau_n$ equal to or greater than the predetermined value of $\tau_0$ or corresponding to the pulse-width ratio $\tau_n/\tau_0$ equal to or greater than unity. The output from the AND circuit 15 can be applied to the one shot multivibrator circuit 13 to drive the latter to provide output waveforms as shown at *d* in FIG. 7. Then the output from the multivibrator circuit 13 is applied to the succeeding demodulator such as the demodulator 8 shown in FIG. 3 for the purpose of demodulation. As in FIG. 4, if the said associated demodulator is of the type just responding to the front edge of the pulse applied thereto to demodulate that pulse, the one shot multivibrator 13 may be omitted.

While the invention has been described in terms of the minimum pulse-width $\tau_0$ equal to the normal pulse-width $\tau$ used in the RADA communication system, the said minimum pulse-width $\tau_0$ may be advantageously selected to be equal to from 0.5 to 0.8 times the normal pulse-width $\tau$ for practical purposes. Under these circumstances, the ratio of the width $\tau_n$ of output pulse from the AND circuit 7 to the normal pulse-width $\tau$ for the RADA system is of course selected to be a value ranging form 0.5 to 0.8.

From the foregoing, it will be appreciated that the objects of the invention have been accomplished by the provision of a simple pulse-width detector circuit followed by a demodulator.

While the invention has been shown and described in conjunction with the certain preferred embodiments thereof it is to be understood that various changes and/or modifications in the details of construction and the arrangement and combination of parts may be resorted to without departing from the spirit and scope of the invention.

We claim:

1. In a RADA receiver system comprising a high frequency amplifier, a plurailty of mixers connected in parallel to the output of said amplifier, a local oscillator feeding respectively to each of said mixers, a detector connected respectively to the output of each of said mixers, a time delay network connected respectively to the output of each of said detectors, said time delay networks imparting different time delays to the outputs of said detectors, and AND circuit connected to the outputs of said time delay circuits and a demodulation connected to the output of said AND circuit; the improvement that comprises inserting between said AND circuit and said demodulator a pulse width detector circuit comprising means including a second AND circuit for producing an output pulse only when an input pulse from said first mentioned AND circuit is of at least a predetermined width and a one-shot multivibrator having an input connected to the output of said second AND circuit and an output connected to said demodulator.

2. A system according to claim 1, in which said pulse width detector circuit comprises a time delay circuit having an input connected to said first mentioned AND circuit and an output connected to said second AND circuit, said second AND circuit being also connected directly to said first mentioned AND circuit.

References Cited

UNITED STATES PATENTS

| | | | |
|---|---|---|---|
| 3,191,058 | 6/1965 | Stone | 307—234 X |
| 3,239,761 | 3/1966 | Goode. | |
| 3,333,187 | 7/1967 | Whitfield | 328—112 X |

RALPH D. BLAKESLEE, Primary Examiner

U.S. Cl. X.R.

32.8—111; 325—42, 322; 307—234